(12) United States Patent
Matsumoto et al.

(10) Patent No.: US 6,325,457 B1
(45) Date of Patent: Dec. 4, 2001

(54) SEAT RECLINING SYSTEM

(75) Inventors: Tadashi Matsumoto, Shizuoka; Youichi Nagasawa, Tokyo, both of (JP)

(73) Assignees: Fuji Kiko Co., Ltd., Kosai; Tachi-S Co., Ltd., Akishima, both of (JP)

( * ) Notice: Subject to any disclaimer, the term of this patent is extended or adjusted under 35 U.S.C. 154(b) by 0 days.

(21) Appl. No.: 09/588,563

(22) Filed: Jun. 7, 2000

(30) Foreign Application Priority Data

Nov. 10, 1999 (JP) .................................................. 11-319083

(51) Int. Cl.$^7$ ........................................................ B60N 2/02
(52) U.S. Cl. ............................................................. 297/366
(58) Field of Search ................................. 297/452.18, 366, 297/361.1, 354.12, 216.13, 344.1, 367

(56) References Cited

U.S. PATENT DOCUMENTS

| | | | |
|---|---|---|---|
| 4,143,905 | * | 3/1979 | Hensel et al. . |
| 4,466,661 | * | 8/1984 | Narita . |
| 4,541,672 | * | 9/1985 | Fukuta et al. . |
| 4,736,986 | * | 4/1988 | Kato et al. . |
| 5,340,196 | * | 8/1994 | Ikegaya et al. . |
| 5,749,624 | * | 5/1998 | Yoshida . |
| 5,988,751 | * | 11/1999 | Yoshida et al. . |
| 6,092,874 | * | 7/2000 | Kojima et al. . |

\* cited by examiner

*Primary Examiner*—Milton Nelson, Jr.
(74) *Attorney, Agent, or Firm*—Foley & Lardner

(57) ABSTRACT

A seat reclining system for an automotive vehicle, arranged to achieve its weight-lightening. The seal reclining system comprises a locking mechanism having first and second axial sides. An arm plate is provided such that the first axial side of the locking mechanism is connected to the arm plate. A seat back of a vehicle seat is connected to the arm plate. A base plate is provided having first and second surfaces which are opposite to each other. The base plate includes an installation portion through which the base plate is connected to a vehicle floor. The base plate further includes a fixed portion having the first surface to which the second axial side of the locking mechanism is connected. Additionally, a reinforcement plate is provided including a main body section having first and second surfaces which are opposite to each other. The reinforcement plate further includes a flange section integral and extended from the main body section. The flange section extends generally perpendicular to a plane which passes through a first position located in front of the fixed portion of the base plate and a second position located behind the installation portion of the base plate. The plane is perpendicular to the surfaces of the base plate. The reinforcement plate is fixed to the base plate in a state where the first surface of the main body section is in contact with the second surface of the base plate.

8 Claims, 5 Drawing Sheets

SEAT RECLINING SYSTEM

BACKGROUND OF THE INVENTION

1. Field of the Invention

This invention relates to improvements in a seat reclining system for a vehicle, and more particularly to a structure for reinforcing a base plate of the seat reclining system.

2. Description of the Prior Art

Modern automotive vehicles are equipped with a seat reclining system which adjusts the rotational position of a seat back of a vehicle seat forward or rearward in order that a vehicle occupant seated on the seat can ensure his optimum and comfortable posture. In a recent tendency in which weight-lightening of vehicular parts is being promoted to meet the requirement of weight-lightening of the vehicle, weight-lightening is required also for the seat reclining systems. In view of this, the thickness of a base plate of the seat reclining system is reduced as compared with a conventional one thereby accomplishing lightening of the seat reclining system.

More specifically, right-side and left-side base plates made of metal are fixed through suitable fixing members to a vehicle floor or fixed respectively to right-side and left-side seat slide devices fixed on the vehicle floor. A seat cushion of the vehicle seat is disposed between the base plates. Each base plate is disposed vertical to the vehicle floor. An arm plate is hingedly connected through a locking mechanism to each base plate. The seat back of the vehicle seat is installed to the arm plate. The locking mechanism is a control section for adjusting the inclination angle of the seat back. Accordingly, the base plate must have a sufficient strength to sustain a load applied to the seat back, so that the thickness of the material (metal plate) of the base plate has been conventionally increased thereby unavoidably increasing the weight of the seat reclining system.

There is one locking system for the seat reclining system, in which two locking mechanisms are respectively installed to the right-side and left-side base plates. Another locking system is arranged such that only one locking mechanism is installed to one of the right-side and left-side base plates so that the other base plate is formed as a freely movable hinge. Concerning the structure of the locking mechanism, hitherto one in which lock parts are assembled to the base plate is in the mainstream; however, recently one in which a unitized locking mechanism is assembled between the base plate and the arm plate has been used. In connection with the latter one, the arm plate is formed to have a reduced thickness and has a flange section along the periphery of the arm plate.

SUMMARY OF THE INVENTION

However, difficulties have been encountered in the above conventional seat reclining systems in which the thickness of the base plate is reduced to achieve weight-lightening of the seat reclining system. That is, the base plate having a reduced thickness is lowered in rigidity. Accordingly, when an excessive load is applied to the seat back, for example, in the event of a rear-end collision of the vehicle, the base plate receives not only a rearward load but also a flexural load in lateral directions due to the load of the vehicle occupant seated. Consequently, a concentrated stress is developed in the vicinity of the front side of a fixed portion (of the base plate) at which the locking mechanism is fixed. As a result, a deformation is produced between the fixed portion and an installation portion of the base plate to a seat slide device or the like, and therefore there is the possibility of the base plate falling down in the lateral directions.

In view of the above, it is an abject of the present invention to provide an improved seat reclining system which can overcome drawbacks encountered conventional seat reclining systems.

Another object of the present invention is to provide an improved seat reclining system in which a base plate can be effectively reinforced to be prevented from being deformed even in the event of a rear-end collision of a vehicle without affecting weight-lighting of the seat reclining system.

A further object of the present invention is to provide an improved seat reclining system in which a base plate is reinforced with a light-weight reinforcement plate which is formed with a flange section in conformity with a deformation plane along which the base plate deforms when an excessive load is applied to a seat back of a vehicle seat.

A seat reclining system according to the present invention is for a vehicle and comprises a locking mechanism having first and second axial sides. An arm plate is provided such that the first axial side of the locking mechanism is connected to the arm plate. A seat back of a vehicle seat is connected to the arm plate. A base plate is provided having first and second surfaces which are opposite to each other. The base plate includes an installation portion through which the base plate is connected to a vehicle floor. The base plate further includes a fixed portion having the first surface to which the second axial side of the locking mechanism is connected. Additionally, a reinforcement plate is provided including a main body section having first and second surfaces which are opposite to each other. The reinforcement plate further includes a flange section integral and extended from the main body section. The flange section extends generally perpendicular to a plane which passes through a first position located in front of the fixed portion of the base plate and a second position located behind the installation portion of the base plate. The plane is perpendicular to the surfaces of the base plate. The reinforcement plate is fixed to the base plate in a state where the first surface of the main body section is in contact with the second surface of the base plate.

The reinforcement plate preferably has a linear bead which extends generally vertically and has an axis which crosses the plane at an acute angle. Additionally, a return spring is preferably disposed between the reinforcement plate and the arm plate so as to rotatably biasing the arm plate. The return spring has an end section connected to the reinforcement plate. Here, the reinforcement plate has a through-hole through which an operation shaft of the locking mechanism passes. Here, the flange section of the reinforcement plate has an engagement section to which the end section of the return spring is engaged. The engagement section is located in the vicinity of the through-hole.

According to the present invention, a strength shortage of the base plate caused by weight-lightening of the seat reclining system can be compensated by using the reinforcement plate formed with the flange section and preferably the bead in conformity with a deformation plane, without affecting the weight-lightening of the seat reclining system. Additionally, a part of the reinforcement plate preferably serves as the engagement section for the end section of the return spring, and therefore the number of component parts can be reduced thereby suppressing the production cost of the seat reclining system at the lowest level.

DETAILED DESCRIPTION OF THE INVENTION

Figure 1:
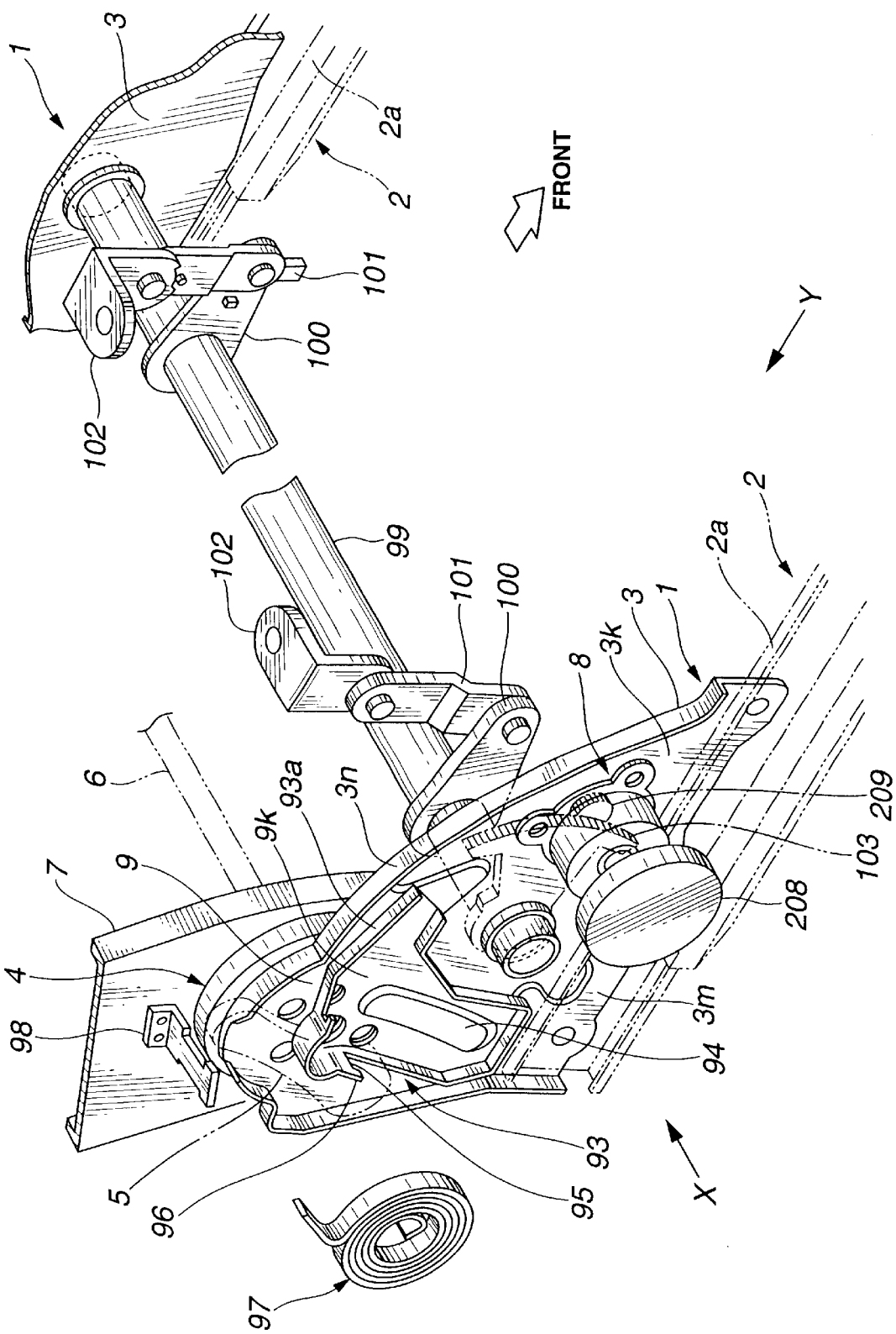
FIG. 1 is a fragmentary perspective view of an essential part of an embodiment of a seat reclining system according to the present invention.
Figure 2:
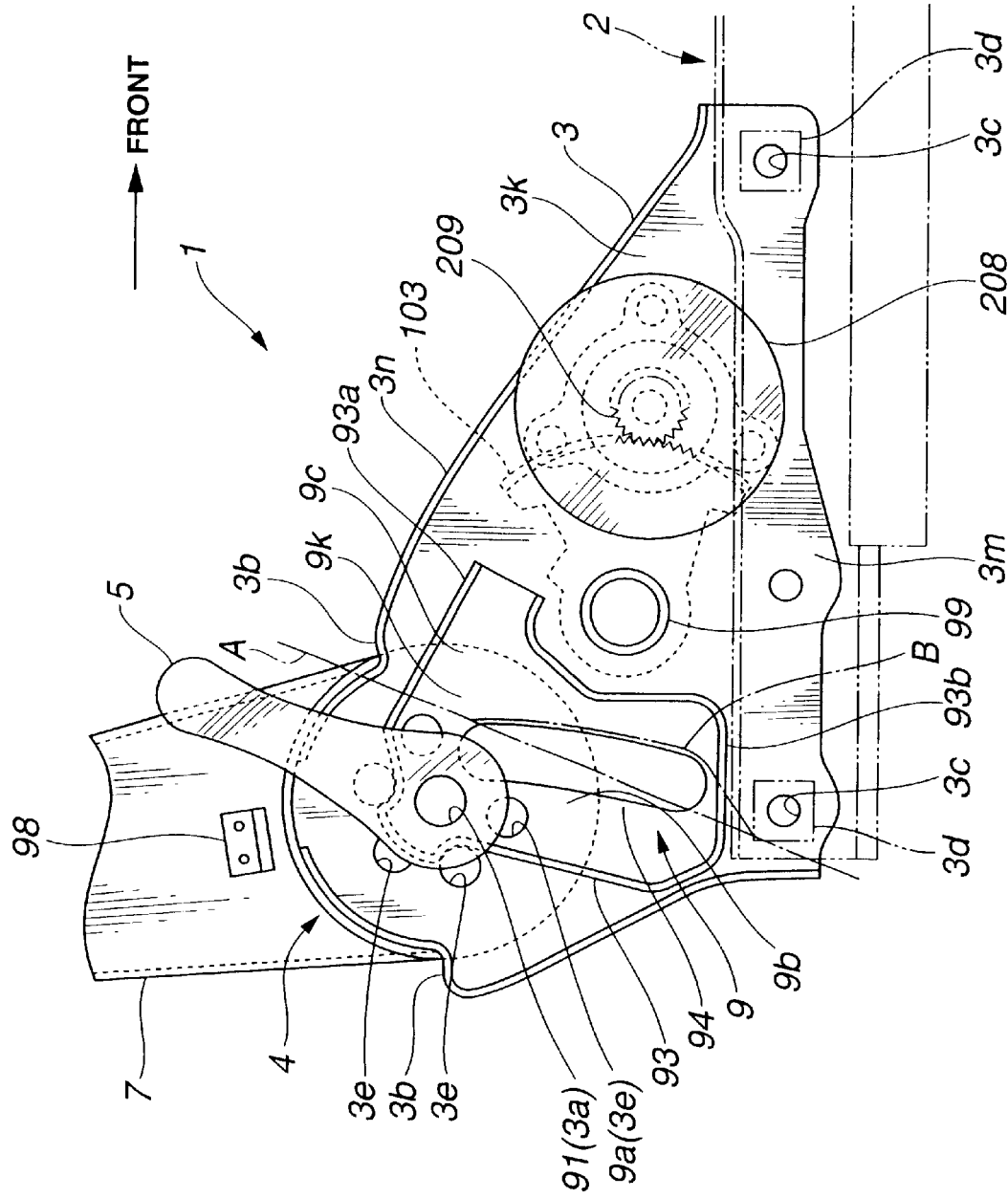
FIG. 2 is a fragmentary side view of the essential part of the seat reclining system of FIG. 1 as viewed from a direction indicated by an arrow X in FIG. 1.
Figure 3:
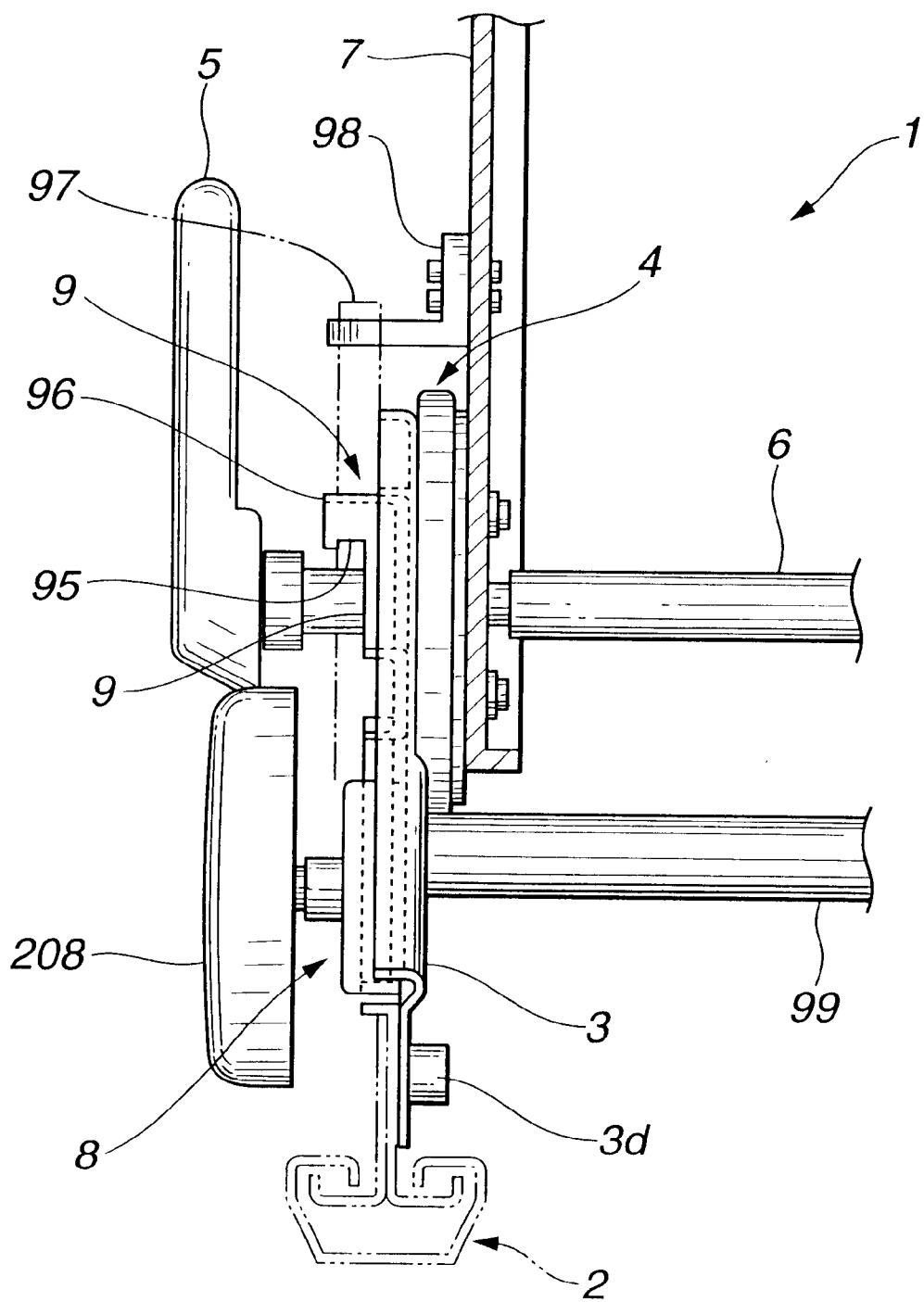
FIG. 3 is a fragmentary front view of the essential part of the seat reclining system of FIG. 1 as viewed from a direction indicated by an arrow Y in FIG. 1.

Referring now to FIGS. 1 to 3, more specifically to FIG. 1, an embodiment of a seat reclining system according to the present invention is illustrated by the reference character 1. In this embodiment, the seat reclining system 1 is for a vehicle seat of an automotive vehicle. The seat reclining system 1 comprises a pair of (right-side and left-side) base plates 3, 3 which are respectively fixed to the vertical walls of right-side and left-side upper rails 1a, 1a of seat slide devices 2, 2 which allow the vehicle seat to move forward and rearward. Each seat slide device 2 is fixed to a vehicle floor (not identified). The right-side base plate 3 constitutes part of a right-side counterpart (not identified) of the seat reclining system 1, while the left-side base plate 3 constitutes part of a left-side counterpart (not identified) of the seat reclining system 1. Locking mechanisms 4, 4 are fixed respectively to the base plates 3, 3, though only the locking mechanism 4 fixed to the right-side base plate 3 is shown. Each locking mechanism 4 is of a so-called round recliner type so as to serve as a unitized reclining locking mechanism. An operation lever 5 for the locking mechanisms 4, 4 is operatively connected to the right-side locking mechanism 4, in which the right-side and left-side locking mechanism 4, 4 are operatively connected to each other through an interlocking shaft 6 so that they are interlocked with each other. As discussed in detail after, the base plate 3 is fixed to one (axial) side of the locking mechanism 4 while an arm plate 7 is fixed to the other (axial) side of the locking mechanism 4. A seat back of the vehicle seat is fixed to the arm plate 7, though not shown. The arm plate 7 is rotatably movable around the locking shaft 6, and therefore the seat back can be rotationally inclined forward and rearward around the interlocking shaft 6 thereby accomplishing a reclining adjustment for the seat back.

While the seat reclining system 1 includes the right-side and left-side counterparts, only the right-side counterpart will be discussed for the sake of simplicity of illustration since the both counterparts are generally the same in structure.

The base plate 3 is generally triangular as viewed from the direction indicated by an arrow X and includes a plate-shaped main body section 3k. The main body section 3k has a horizontally extending bottom section 3m which is formed with installation holes 3c through which the base plate 3 is connected to the upper rail 2a of the seat slide device 2. The installation holes 3c are formed at at least front and rear portions (installation portions) of the bottom section 3m. A nut 3d is fixed to the base plate 3 by welding or the like and has an installation or central opening which is coaxial with the installation hole 3c. A bolt (not shown) is screwed into the installation opening of the nut 3d so as to fix the base plate 3 to the upper rail 2a of the seat slide device 2.

The main body section 3k of the base plate 3 has a top or fixed portion to which the locking mechanism 4 is fixed. The top portion is formed with a plurality of holes 3e (six holes in this embodiment) through which the locking mechanism 4 is fixed thereto. Into the holes 3e, projections 19 of a circular frame or base 10 (See FIG. 5) of the locking mechanism 4 are fitted and fixed by welding or the like. The base plate 3 is integrally provided with a laterally projecting flange section 3n which extends along the periphery of the main body section 3k except for the periphery of the bottom section 3m. The flange section 3n at the top section of the main body section 3k is formed arcuate in cross-section to form an arcuate flange portion which extends along a circle whose center corresponds to the rotational axis of the locking mechanism 4 as viewed from the direction indicated by the arrow X. The arcuate flange portion is formed at its opposite ends with arm stoppers 3b, 3b each of which generally radially outwardly projects, in which an angular depression is formed between each end of the arcuate flange portion and each arm stopper 3b. The arm stoppers 3b, 3b are to be brought into contact with a stopper (not shown) formed on the arm plate 7, thereby restricting a range of rotational movement of the arm plate 7.

As discussed above, the locking mechanism 4 is fixed to one side surface of the base plate 3. A reinforcement plate 9 is fixed to other side surface of the base plate 3. As shown in FIG. 2, the reinforcement plate 9 includes a plate-shaped main body section 9k which has a fixed portion (not identified) to which the locking mechanism 4 is fixed through the fixed portion of the base plate 3. The main body section 9k has a vertically extending portion 9b which generally vertically extends from the fixed portion so that its lower end reaches the vicinity of the rear-side installation hole 3c. The reinforcement plate 9 is fixed through the fixed portion to the base plate 3. The main body section 9k of the reinforcement plate 9 has a forward extending portion which extends forward from the fixed portion. The fixed portion of the main body section 9k is formed with installation holes 9a which are respectively coincident with the installation holes 3e of the base plate 3, so that the reinforcement plate 9 is fixed to the base plate 3 upon the welding or the like for the locking mechanism 4. Additionally, the fixed portion of the main body section 9k is formed with a through-hole 91 coincident with a shaft hole 3a of the base plate 3, in which an operation shaft 30 (See FIGS. 4 and 5) of the locking mechanism 4 passes through the through-hole 91 and the shaft hole 3a. A flange section 93 is integrally formed generally along the periphery of the main body section 9k of the reinforcement plate 9.

Now, in the event that an excessive load is applied to the seat back under a rear-end collision (collision occurred at a rear section of an automotive vehicle) or the like, the base plate 3 tends to deform along a deformation plane A in FIG. 2 which deformation plane passes through a first position located in the vicinity of and in front of the fixed portion (or the installation holes 3e) of the base plate 3 and through a second position located in the vicinity of and behind the rear portion (the rear-side nut 3d) of the bottom section 3m of the base plate 3. This tendency is predominant particularly in case that the angular depression is formed between each end of the arcuate flange portion and each arm stopper 3b. In view of this, the reinforcement plate 9 is disposed such that an upper part 93a of the flange section 93 extends generally perpendicular to the deformation plane A.

Additionally, the reinforcement plate 9 is formed with a linear bead or projection 94 which is located at the generally central part of the main body section 9k. The bead 94 extends generally along the deformation plane A, and has a longitudinal axis (not shown) which is slightly angular relative to the deformation plane A as viewed from the direction of the arrow X, as illustrated in FIG. 2. In other words, the longitudinal axis crosses the deformation plane A at an acute angle on a plane parallel with the surface of the main body section 3k of the base plate 3. A part of the flange section 93 of the reinforcement plate 9 located around the through-hole 91 is formed larger in width than other parts of the flange section 93. The part of the flange section 93 located around the through-hole 91 is formed generally semicylindrical and extends laterally outwardly over the other parts of the flange section 93. The semicylindrical part of the flange section 93 is formed at its one end section with an engagement section 96 formed with a cutout 95 to which one end portion of a spirally wound return spring 97 is engaged. The other end section of the return spring 97 is engaged with an engagement projection 98 fixed to the arm plate 7 with pins or by welding. Accordingly, the return spring 97 is adapted to always bias the arm plate 7 in a direction to fall forward.

With the above arrangement, in the event that an excessive load is applied to the arm plate 7 under the rear-end collision of the automotive vehicle, a concentrated stress is developed in the vicinity of and in front of the fixed portion of the base plate 3 so that deformation of the base plate 3 is to be made along the deformation plane A. At this time, the flange section 93 of the reinforcement plate 9 effectively prevents the reinforcement plate 9 from being deformed. Particularly by virtue of the upper part 93a of the flange section 93 extending generally perpendicular to the deformation plane A, the rigidity of the base plate 3 can be largely improved. Additionally, the bead 94 formed slightly angularly relative to the deformation plane A can bend the deformation plane A as indicated by a plane B, so that the rigidity of the base plate 3 is further improved. Thus, the base plate 3 can be effectively prevented from being deformed.

In addition, a pipe shaft 99 laterally extends to connect the right-side and left-side base plates 3, 3 in such a manner that the opposite end sections thereof respectively pass through the base plates 3, 3. Each end section of the pipe shaft 99 is rotatably supported by the base plate 3. Right-side and left-side link arms 100, 100 are mounted and fixed respectively on the opposite end sections of the pipe shaft 99 by means of welding or the like, in such a manner that each link arm 100 extends perpendicular to the pipe shaft 99. A link lever 101 is pivotally attached to each link arm 100. A seat fixing member 102 to be fixed to the seat cushion of the vehicle seat is pivotally attached to each link lever 101. A sector gear 103 is fixedly mounted on the right-side end section of the pipe shaft 99 in such a manner as to extend perpendicular to the pipe shaft 99. A ring (not identified) is fixedly mounted on the left-side end section of the pipe shaft 99 and is prevented from coming out by a push nut (not shown). The sector gear 103 is engaged with a pinion 209 of a spring brake device 8 which is installed to the light-side base plate 3. The spring brake device 8 constitutes a seat lifter mechanism for vertically moving the vehicular seat. The spring brake device 8 is provided with a knob 208 connected to the pinion. It will be understood that the right-side and left-side base plates 3, 3 are connected to each other through the pipe shaft 99 in such so as to be laterally supported to each other, thereby improving the rigidity of the base plates 3, 3 in the lateral direction.

Figure 4:
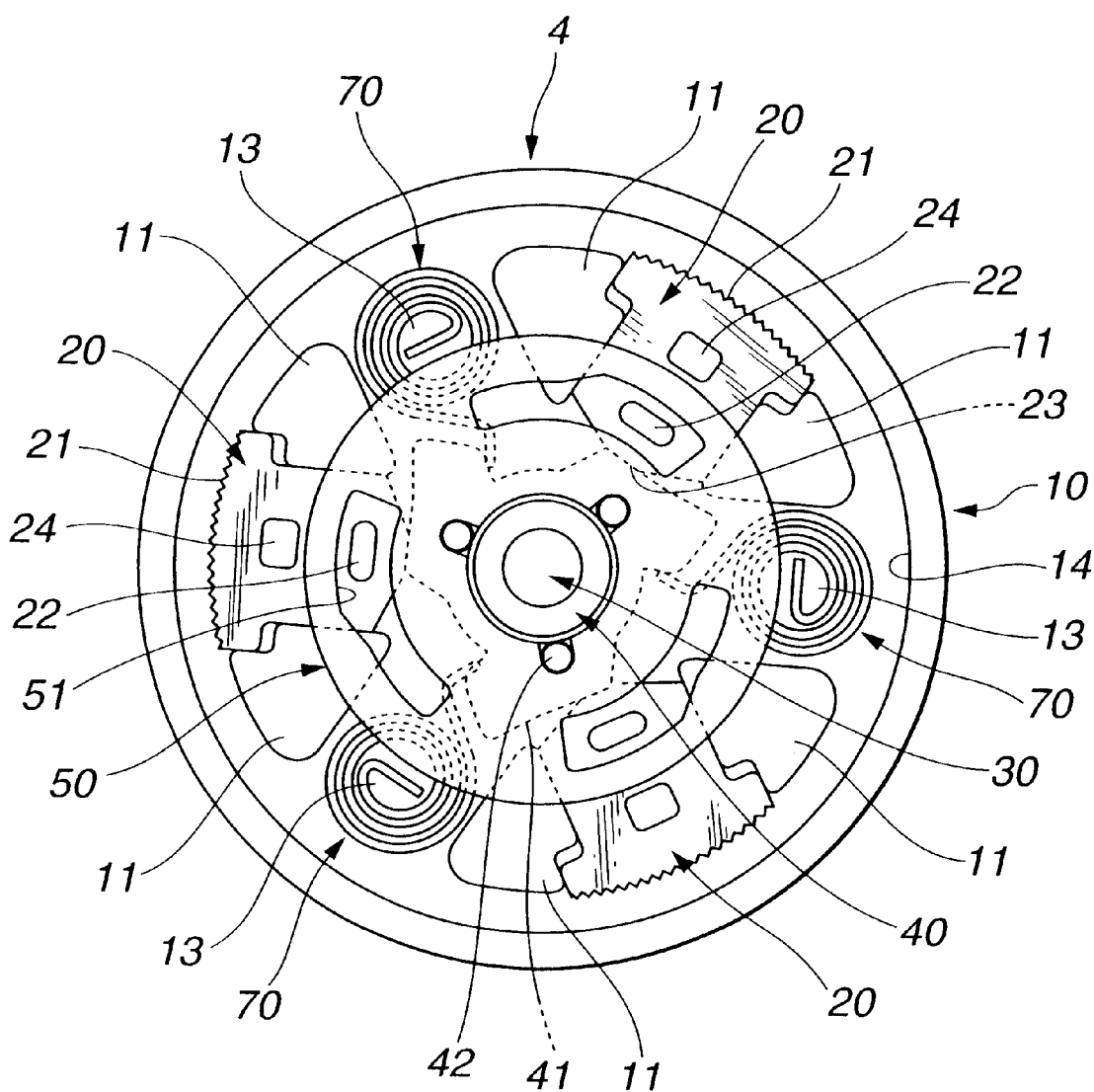
FIG. 4 is a front view of a locking mechanism used in the seat reclining system of FIG. 1 in a state where a lid member and a cover member are removed.
Figure 5:
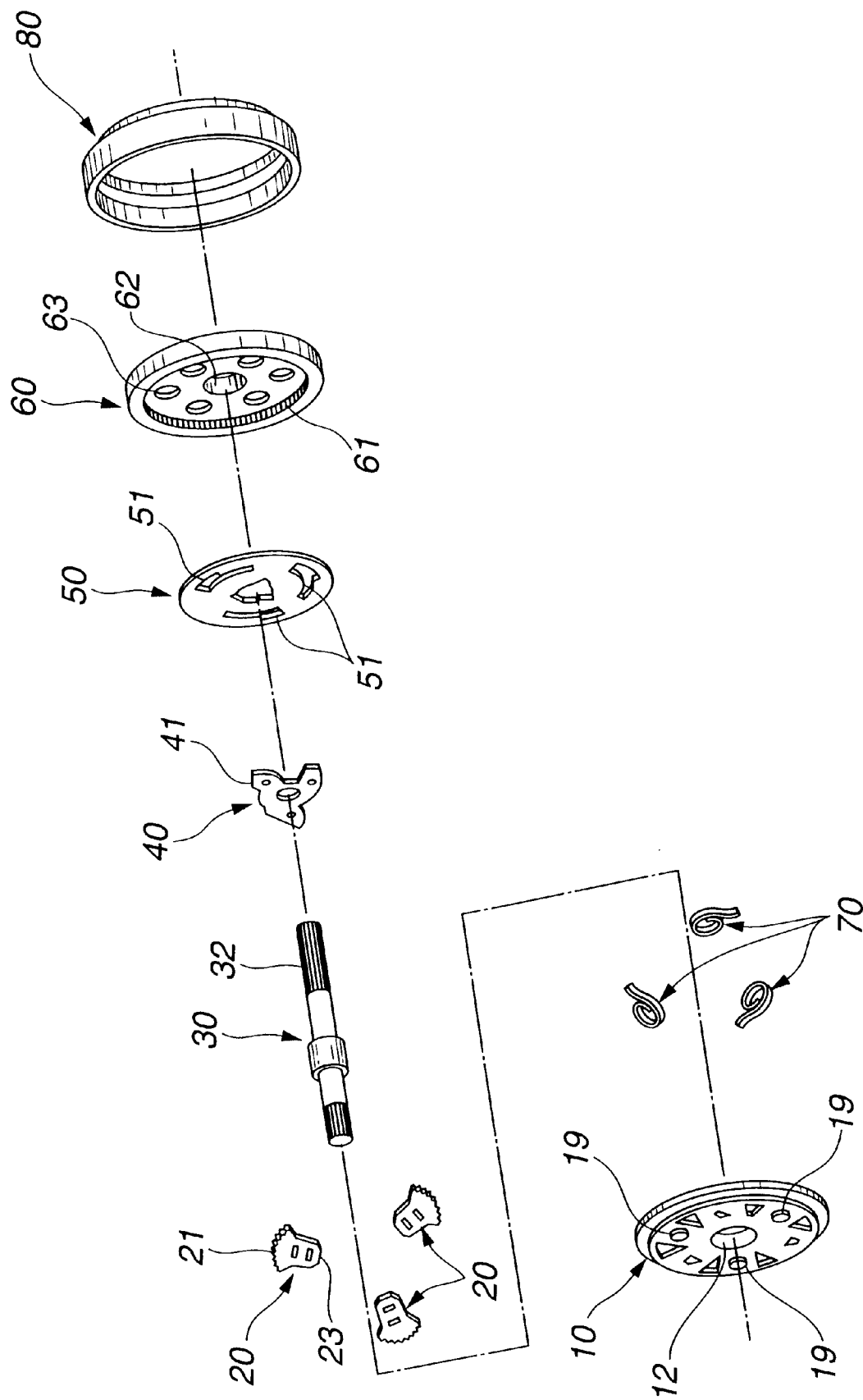
FIG. 5 is an exploded perspective view of the locking mechanism of FIG. 4.

As shown in FIGS. 4 and 5, the locking mechanism 4 includes the circular frame 10 which is formed with a circular depression 14 in which a lid member 60 is rotatably fitted. The lid member 60 has a cylindrical flange section (not identified) which has an outer peripheral surface slidably contacted with the inner peripheral surface of the circular depression 14 of the frame 10. The cylindrical flange section of the lid member 60 has an inner peripheral surface at which an internal gear 61 is formed. Three locking gears 20 are radially slidably disposed on the inner surface of the lid member 60 and engageable with the internal gear 61 of the lid member 60. The operation shaft 30 is disposed passing through a central though-hole 12 formed in the frame 10 and a central through-hole 62 formed in the lid member 60. The operation shaft 30 is rotatable relative to the frame 10 and the lid member 60. A cam-shaped member 40 is fixedly mounted on the operation shaft 30 and engaged with the locking gears 20 so as to radially outwardly move the locking gears 20 when the operation shaft 30 is rotationally operated. A plate 50 is mounted on the operation shaft 30 and disposed facing the inner surface of the cam-shaped plate 40 so as to radially inwardly move the locking gears 20 in timed relation to the movement of the cam-shaft plate 40 due to rotation of the operation shaft 30. Locking springs 70 are disposed to always bias the cam-shaped plate 40 in a direction to establish a locking state of the locking mechanism 4. Specifically, the locking gears 20 are brought into engagement with the internal gear 61 of the lid member 60 under the biasing force of the locking springs 70 so as to prevent a relative rotational movement between the frame 10 and the lid member 60. When the operation shaft 30 is rotated clockwise in FIG. 4, the locking gears 20 are moved radially inwardly under the action of the plate 50 thereby establishing a unlocking state of the locking mechanism 4, in which a free relative rotation between the frame 10 and the lid member 60 can be accomplished.

More specifically, in this embodiment, the three locking gears 20 are disposed facing the inner surface of the frame 10. Each locking gear 20 is radially slidably fitted between a pair of guides 11 formed extending radially outwardly at the inner surface of the frame 10. Each locking gear 20 is formed at its outer periphery with an arcuate external gear 21 having the same curvature as the internal gear 61 of the lid member 60, so that the internal and external gears 61, 21 are mesh with each other. Each locking gear 20 is formed at its inner surface with a projection engageable with a cam hole 51 formed in the plate 50. The operation shaft 30 are loosely fitted in the through-hole 12 of the frame 10 and the through-hole 62 of the lid member 60, and additionally loosely fitted in the through-hole 3a formed in the base plate 3 and in the through-hole 91 formed in the arm plate 7. The operation shaft 30 has an outer end section projected out of the base plate 3 on which end section the operation lever 5 is fixedly mounted. The operation shaft 30 has an inner end section projected in the arm plate 7 which end section is formed at its peripheral surface with splines 32 for connection with the interlocking shaft 6.

The cam-shaped plate 40 is press-fitted on the central section of the operation shaft 30 is formed with the cam faces 41 which are respectively in slidable contact with the engagement faces 23 of the locking gears 20, the engagement faces 23 being formed opposite to the external gear 21. The frame 10 is formed at its inner surface with three projections 13 to which the base end sections of the locking springs 70 are installed. The cam-shaped plate 40 has three engagement sections (not identified) to which the outer end sections of the three locking springs 70 are respectively engaged, so that the locking gears 20 are always biased radially outwardly.

The plate 50 is formed with a central installation hole which is fitted with installation projections 42 of the cam-shaped plate 40. The installation projections 42 are projected from the inner surface of the cam-shaped plate 40 and aligned along a circumference around the operation shaft 30 at intervals of an angle of 120 degrees. Accordingly, the plate 50 is rotatable with the operation shaft 30 as a single member. The plate 50 is formed with the cam holes 51 in which the projections 22 formed on the inner surface of the locking gears 20 are respectively engaged. The lid member 60 is fitted in the circular depression 14 formed at the inner surface of the frame 10. The plate 50 is rotatably disposed between the inner surface of the frame 10 defining the annular depression 14 and the outer surface of the lid member 60 defining a circular depression (not identified), and rotatable relative to the frame 10. The latter circular depression is also defined by the annular internal gear 61 which is engageable with the external gear 21 of the locking gear 21. Each locking gear 20 is formed with a projection 24 located close and radially outward of the projection 22. The projection 24 is in contact with the inner surface of the lid member 60 so as to prevent a play of the locking gear 20 from being formed between the lid member 60 and the frame 10. A ring-shaped cover member 80 is fitted around the outer peripheries of the fitted frame 10 and lid member 60, so that the frame 10 and the lid member 60 are supported rotatable relative to each other.

The lid member 60 is formed at its inner surface with a plurality of (for example, six) projections 63 which are engaged respectively with (for example, six) installation holes formed in the arm plate 7, upon which the lid member 60 and the arm plate 7 are fastened to each other by welding, similarly to fastening between the frame 10 and the base plate 3.

With the thus arranged locking mechanism 4, each locking gear 20 is pressed radially outwardly under the locking spring 70 and the cam-shaped plate 40, so that the external gear 21 is engaged with the internal gear 61 of the lid member 60. As a result, the lid member 60 is prevented from being rotated so that the locking mechanism 4 is put into the locking state. In this locking state, when the operation lever 5 is operated to rotate the operation shaft 30 clockwise in FIG. 4, each engagement section of the cam-shaped plate 40 comes out from the engagement face 23 of each locking gear 20, so that the locking gear 20 is moved radially inwardly under the cooperative actions of the cam holes 51 of the plate 50 and the projections 22 of the rocking gear 20. Consequently, engagement between the external gear 21 of the locking gear 20 and the internal gear of the lid member 60 is released to allow the lid member 60 to rotate, thereby releasing the locking state of the locking mechanism 4. Then, the arm plate 12 to which the lid member 60 is fixed is rotated under the biasing force of the return spring 97 so as to rotationally move forward or in a direction indicated by an arrow FRONT in FIG. 2.

When the knob 208 of the spring brake device 8 is operated to rotate in one direction or in an opposite direction, the sector gear 103 is rotated upwardly or downwardly through the pinion or drive gear 209 so as to rotate the pipe shaft 99 in one direction or in an opposite direction. Consequently, the link arms 100, 100 are moved upwardly or downwardly, so that the seat fixing members 102, 102 are moved upwardly or downwardly through the link levers 101, 101. As a result, the rear section of the seat cushion is moved upwardly or downwardly thereby adjusting positions of eyes of a vehicle occupant seated on the vehicle seat.

While only the locking mechanism constituting the round recliner has been shown and described, it will be understood that the locking mechanism may be replaced with a stepless locking mechanism including a planetary gear mechanism. Additionally, although the locking mechanism has been shown and described as being disposed in such a manner that the opposite sides thereof are respectively fixed to the base plate and the arm plate, it will be appreciated that the outer peripheral sections of the frame 10 and the lid member 60 may be formed extending to form extended fixing sections to which the base plate 3 and the arm plate 7 are fixed. Further, while welding has been described as being made to fasten the locking mechanism 4 to the base plate 3 and to the reinforcement plate 9, it will be understood that caulked pins or the like may be used in place of the welding.

Although the deformation plane A of the base plate 3 may shifts according to the shape of the flange section 3n of the base plate 3 and/or the installation surface of the upper rail to which the base plate is installed, deformation basically tends to occur in the vicinity of a section having a high rigidity so that the deformation plane A usually passes through a position in the vicinity and in front of the fixed portion (or the installation hole 3e) of the base plate 3 and through another position in the vicinity of and behind the rear portion (the front side of the rear-side nut 3d) of the bottom section 3m of the base plate 3.

As appreciated from the above, according to the above embodiment, a strength shortage of the base plate caused by weight-lightening of the seat reclining system can be effectively compensated by using the reinforcement plate formed with the flange section and the bead in conformity with the deformation plane, without affecting the weight-lightening of the seat reclining system. Additionally, the part of the reinforcement plate serves as the engagement section for the end section of the return spring, and therefore the number of component parts can be reduced thereby suppressing the production cost of the seat reclining system at the lowest level.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A seat reclining system for a vehicle, comprising:
   a locking mechanism having first and second axial sides;
   an arm plate to which the first axial side of said locking mechanism is connected, a seat back of a vehicle seat being connected to said arm plate;
   a base plate having first and second surfaces which are opposite to each other, said base plate including an installation portion through which said base plate is connected to a vehicle floor, and a fixed portion having the first surface to which the second axial side of said locking mechanism is connected; and
   a reinforcement plate including a main body section having first and second surfaces which are opposite to each other, and a flange section integral and extended from the main body section, said flange section extending generally perpendicular to a plane which passes through a first position located in front of the fixed portion of said base plate and a second position located behind the installation portion of said base plate, said plane being perpendicular to the surfaces of said base plate, said reinforcement plate being fixed to said base plate in a state where the first surface of said main body section is in contact with the second surface of said base plate so that said base plate is located between said reinforcement plate and said locking mechanism, said main body section of said reinforcement plate extends forward generally in a first direction with respect to said fixed portion of said base plate and extends downward generally in a second direction from said fixed portion of said base plate to said installation portion of said base plate.

2. A seat reclining system for a vehicle as claimed in claim 1, wherein the first direction in which said main body section of said reinforcement plate extends is directed away from said fixed portion of said base plate toward a point distal therefrom.

3. A seat reclining system as claimed in claim 1, wherein said installation portion of said base plate includes first and second installation portions, the first installation portion being located behind the second installation portion in a fore-and-aft direction of the vehicle, wherein said second position is located behind the first installation portion of said base plate.

4. A seat reclining system as claimed in claim 1, wherein said base plate is fixed to a seat slide device through said installation portion.

5. A seat reclining system as claimed in claim 1, wherein said locking mechanism is unitized and has a major part which is disposed between said arm plate and said base plate.

6. A seat reclining system as claimed in claim 1, wherein said main body section of said reinforcement plate includes a fixed portion to which said locking mechanism is fixed through said fixed portion of said base plate, a vertically extending portion extending downward from the fixed portion of said main body section toward said installation portion of said base plate, and a forward extending portion extending forward from said fixed portion of said main body section.

7. A seat reclining system for a vehicle, comprising:

a locking mechanism having first and second axial sides;

an arm plate to which the first axial side of said locking mechanism is connected, a seat back of a vehicle seat being connected to said arm plate;

a base plate having first and second surfaces which are opposite to each other, said base plate including an installation portion through which said base plate is connected to a vehicle floor, and a fixed portion having the first surface to which the second axial side of said locking mechanism is connected;

a reinforcement plate including a main body section having first and second surfaces which are opposite to each other, and a flange section integral and extended from the main body section, said flange section extending generally perpendicular to a plane which passes through a first position located in front of the fixed portion of said base plate and a second position located behind the installation portion of said base plate, said plane being perpendicular to the surfaces of said base plate, said reinforcement plate being fixed to said base plate in a state where the first surface of said main body section is in contact with the second surface of said base plate; and a return spring disposed between said reinforcement plate and said arm plate so as to rotatably bias said arm plate, said return spring having an end section connected to said reinforcement plate, wherein said reinforcement plate has a through-hole through which an operation shaft of said locking mechanism passes, wherein said flange section of said reinforcement plate has an engagement section to which the end section of said return spring is engaged, said engagement section being located in the vicinity of said through-hole.

8. A seat reclining system for a vehicle, comprising:

a locking mechanism having first and second axial sides;

an arm plate to which the first axial side of said locking mechanism is connected, a seat back of a vehicle seat being connected to said arm plate;

a base plate having first and second surfaces which are opposite to each other, said base plate including an installation portion through which said base plate is connected to a vehicle floor, and a fixed portion having the first surface to which the second axial side of said locking mechanism is connected; and a reinforcement plate including a main body section having first and second surfaces which are opposite to each other, and a flange section integral and extended from the main body section, said flange section extending generally perpendicular to a plane which passes through a first position located in front of the fixed portion of said base plate and a second position located behind the installation portion of said base plate, said plane being perpendicular to the surfaces of said base plate, said reinforcement plate being fixed to said base plate in a state where the first surface of said main body section is in contact with the second surface of said base plate;

wherein said reinforcement plate has a linear bead extending generally vertically and has an axis which crosses said plane at an acute angle.

* * * * *